United States Patent
Hayamizu et al.

(10) Patent No.: US 11,306,231 B2
(45) Date of Patent: Apr. 19, 2022

(54) SPRAYER

(71) Applicant: AGC Inc., Chiyoda-ku (JP)

(72) Inventors: Hiroki Hayamizu, Chiyoda-ku (JP); Masato Fukushima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/830,360

(22) Filed: Mar. 26, 2020

(65) Prior Publication Data

US 2020/0239755 A1 Jul. 30, 2020

Related U.S. Application Data

(63) Continuation of application No. PCT/JP2018/036101, filed on Sep. 27, 2018.

(30) Foreign Application Priority Data

Sep. 28, 2017 (JP) .............................. JP2017-187614

(51) Int. Cl.
   *C09K 3/30* (2006.01)
   *B65D 83/14* (2006.01)

(52) U.S. Cl.
   CPC .............. *C09K 3/30* (2013.01); *B65D 83/752* (2013.01); *C09K 2205/122* (2013.01); *C09K 2205/126* (2013.01)

(58) Field of Classification Search
   CPC . C09K 3/30; C09K 5/044; C09K 5/04; C09K 2205/126; C09K 2205/122
   See application file for complete search history.

(56) References Cited

U.S. PATENT DOCUMENTS

| 2007/0007488 A1 | 1/2007 | Singh et al. |
| 2013/0292599 A1 | 11/2013 | Robin |
| 2020/0230454 A1* | 7/2020 | Robin .................. A62D 1/0071 |

FOREIGN PATENT DOCUMENTS

| JP | 2016-104873 A | 6/2016 |
| JP | 2017-061704 A | 3/2017 |
| WO | WO 2017/146189 A1 | 8/2017 |

OTHER PUBLICATIONS

International Search Report dated Dec. 18, 2018 in PCT/JP2018/036101 filed on Sep. 27, 2018, 1 page.

* cited by examiner

*Primary Examiner* — John R Hardee (74) *Attorney, Agent, or Firm* — Oblon, McClelland, Maier & Neustadt, L.L.P.

(57) ABSTRACT

To provide a sprayer with high safety, specifically, a sprayer from which a component to be sprayed is incombustible and which imposes less environmental burden. A sprayer comprising a container, a propellant composition containing 1-chloro-2,3,3,3-tetrafluoropropene contained in the interior of the container, and a spray unit to spray the propellant composition to the outside of the container, wherein the propellant composition to be sprayed satisfies (1) in a predetermined combustion test, the propellant composition to be sprayed is evaluated to "have no combustibility", and (2) the global warming potential (100 years) in accordance with Intergovernmental Panel on Climate Change (IPCC), Fifth assessment report, is less than 10, throughout the entire period over which the sprayer is used.

18 Claims, 2 Drawing Sheets

SPRAYER

TECHNICAL FIELD

The present invention relates to a sprayer. Particularly, it relates to a sprayer having high safety and imposing less environmental burden.

BACKGROUND ART

Heretofore, in a one component sprayer which sprays a propellant itself such as a dust blower and a two component sprayer which sprays a chemical agent together with a propellant such as an aerosol product, as the propellant, a hydrofluorocarbon (HFC), for example, 1,1,1,2-tetrafluoroethane (HFC-134a) has been used. Among HFCs, HFC-134a is incombustible and has less influence over the ozone layer, but is known to have a high global warming potential (GWP).

Accordingly, in recent years, a hydrofluoorolefin (HFO), a hydrochlorofluoroolefin (HCFO) and a chlorofluoroolefin (CFO) having a carbon-carbon double bond, which is easily decomposed by OH radicals in the air, and thereby having less influence over the ozone layer and a low GWP, have been expected (for example, Patent Document 1). In this specification, unless otherwise specified, a saturated HFC will be referred to as a HFC and is distinguished from a HFO. Further, a HFC may sometimes be referred to as a saturated hydrofluorocarbon.

However, 1,3,3,3-tetrafluoropropene (HFO-1234ze) and 2,3,3,3-tetrafluoropropene (HFO-1234yf), which are HFOs which have been widely used in recent years, are known to have combustibility and their safety are of concern.

PRIOR ART DOCUMENTS

Patent Documents

Patent Document 1: JP-A-2016-104873

DISCLOSURE OF INVENTION

Technical Problem

Under these circumstances, it is an object of the present invention to provide a sprayer with high safety, specifically, from which a component to be sprayed is incombustible and which imposes low environmental burden.

Solution to Problem

The present invention provides a sprayer having the following constitutions.
[1] A sprayer comprising a container, a propellant composition containing 1-chloro-2,3,3,3-tetrafluoropropene (HCFO-1224yd) contained in the interior of the container, and a spray unit to spray the propellant composition to the outside of the container, wherein the propellant composition to be sprayed satisfies the following requirements (1) and (2) throughout the entire period over which the sprayer is used:
(1) in the following combustion test, the propellant composition to be sprayed is evaluated to "have no combustibility":
in combustion test carried out with respect to a mixture of a specimen and air in a container controlled at 60° C.±3° C. under 101.3 kPa±0.7 kPa in facilities as specified in ASTM E-681-09, when the mixture has no combustibility in the entire range of a proportion of the specimen to the total volume of the mixture being higher than 0 vol % and up to 100 vol %, such a specimen is evaluated to "have no combustibility"; in the combustion test, in a gaseous phase in the vicinity of the center of the container, a fire is made by discharge ignition under 15 kV at 30 mA for 0.4 second, spread of flame is visually confirmed, and when the angle of spread of the flame upward is less than 90 degrees, such a specimen is evaluated to have no combustibility;
(2) the global warming potential (100 years) in accordance with Intergovernmental Panel on Climate Change (IPCC), Fifth assessment report, is less than 10.
[2] The sprayer according to [1], wherein HCFO-1224yd consists of (Z)-1-chloro-2,3,3,3-tetrafluoropropene (HCFO-1224yd(Z)) and (E)-1-chloro-2,3,3,3-tetrafluoropropene (HCFO-1224yd(E)), and the proportion of HCFO-1224yd (Z) to the total amount of HCFO-1224yd is at least 80 mass % and at most 100 mass %. [3] The sprayer according to [1] or [2], wherein the propellant composition further contains a hydrofluoroolefin.
[4] The sprayer according to [3], wherein the hydrofluoroolefin contains at least one member selected from 2,3,3,3-tetrafluoropropene (HFO-1234yf), 1,3,3,3-tetrafluoropropene (HFO-1234ze) and 1,1,1,4,4,4-hexafluoro-2-butene (HFO-1336mzz).
[5] The sprayer according to any one of [1] to [4], wherein the propellant composition comprises HCFO-1224yd(Z) and (E)-1,3,3,3-tetrafluoropropene (HFO-1234ze(E)), and the proportion of HCFO-1224yd(Z) is at least 20 mass % and less than 100 mass % to the total mass of HCFO-1224yd(Z) and HFO-1234ze(E) in a gaseous phase portion in the container filled with the propellant composition so that the liquid phase portion is 90 vol %.
[6] The sprayer according to any one of [1] to [4], wherein the propellant composition comprises HCFO-1224yd(Z) and HFO-1234yf, and the proportion of HCFO-1224yd(Z) is at least 30 mass % and less than 100 mass % to the total mass of HCFO-1224yd(Z) and HFO-1234yf in a gaseous phase portion in the container filled with the propellant composition so that the liquid phase portion is 90 vol %.

Advantageous Effects of Invention

According to the present invention, a sprayer with high safety, specifically, a sprayer from which a component to be sprayed is incombustible and which imposes low environmental burden, can be provided.

DESCRIPTION OF EMBODIMENTS

Now, the present invention will be described with reference to drawings.

In this specification, abbreviated names of halogenated hydrocarbon compounds are described in brackets after the compound names, and the abbreviated names are employed instead of the compound names as the case requires. Further, as abbreviated names, only numerals and small alphabet letters after a hyphen (-) (for example, "1224yd" in the case of "HCFO-1224yd") may be used.

Further, (E) before the compound name or after its abbreviated name of a compound having cis-trans isomers represents an E-form (trans-isomer) and (Z) represents a Z-form (cis-isomer). The compound name or the abbreviated name without description of E or Z generally means E-form, Z-form and a mixture of E-form and Z-form.

In this specification, evaluation of "combustibility" is based on the following standards.

In combustion test carried out with respect to a mixture of a specimen and air in a container controlled at 60° C.±3° C. under 101.3 kPa±0.7 kPa in facilities as specified in ASTM E-681-09, when the mixture has no combustibility in the entire range of a proportion of the specimen to the total volume of the mixture being higher than 0 vol % and up to 100 vol %, such a specimen is evaluated to "have no combustibility". The wording "incombustible" is synonymously used with the wording "having no combustibility". When a mixture of a specimen and air has combustibility in any proportion, such a specimen is evaluated to "have combustibility" or to "have a combustible range".

In the combustion test, in a gaseous phase in the vicinity of the center of the container, a fire is made by discharge ignition under 15 kV at 30 mA for 0.4 second, spread of flame is visually confirmed, and when the angle of spread of the flame upward is at least 90 degrees, such a specimen is evaluated to have combustibility, and when the angle is less than 90 degrees, such a specimen is evaluated to have no combustibility.

In this specification, GWP is a value (100 years) in Intergovernmental Panel on Climate Change (IPCC), Fifth assessment report (2014), or a value measured in accordance therewith. Further, GWP of a mixture is represented by a weighted average by the composition mass.

In this specification, "spraying" means that a content including a propellant composition filled in the interior of a sprayer is sprayed from the interior of the sprayer to the outside by the propellant composition in a liquid state, a gaseous state, a solid state or a mixed state thereof.

Figure 1A:
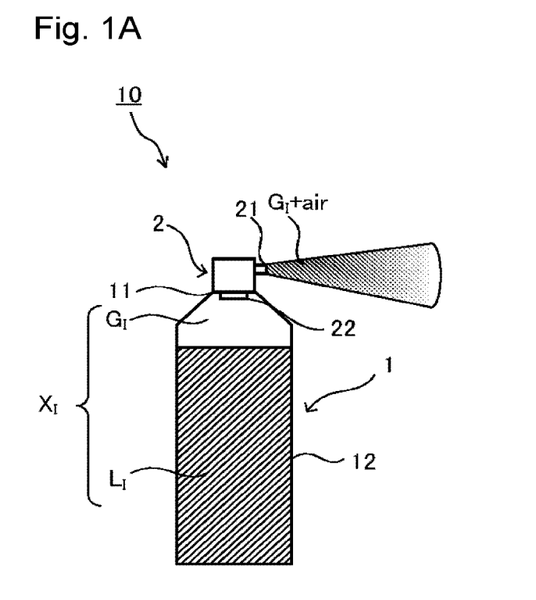
FIG. 1A is a schematic view illustrating a use example of one example of a one component type of the sprayer of the present invention.
Figure 1B:
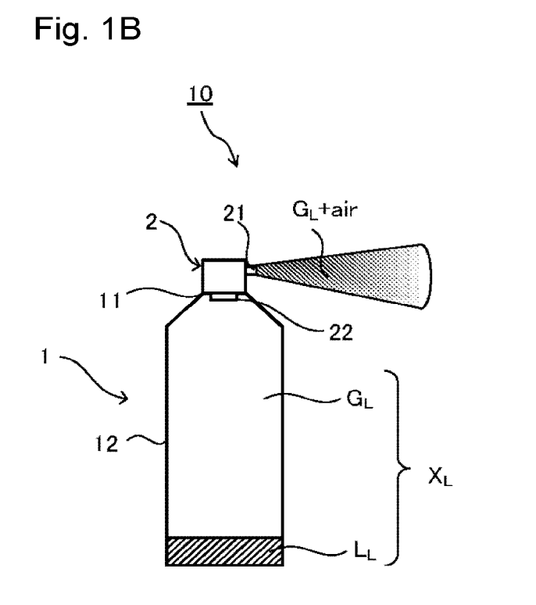
FIG. 1B is a schematic view illustrating a use example of one example of a one component type of the sprayer of the present invention.
Figure 2A:
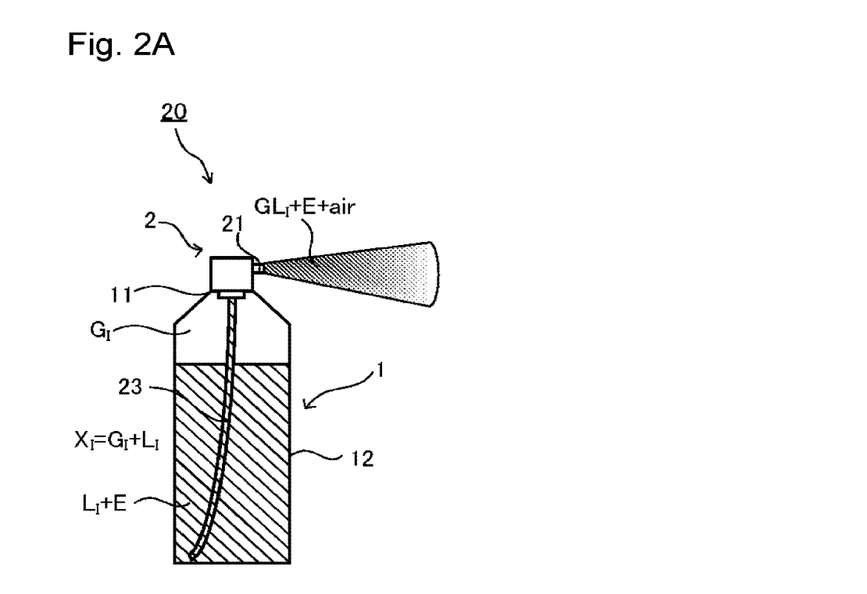
FIG. 2A is a schematic view illustrating a use example of one example of a two component type of the sprayer of the present invention.
Figure 2B:
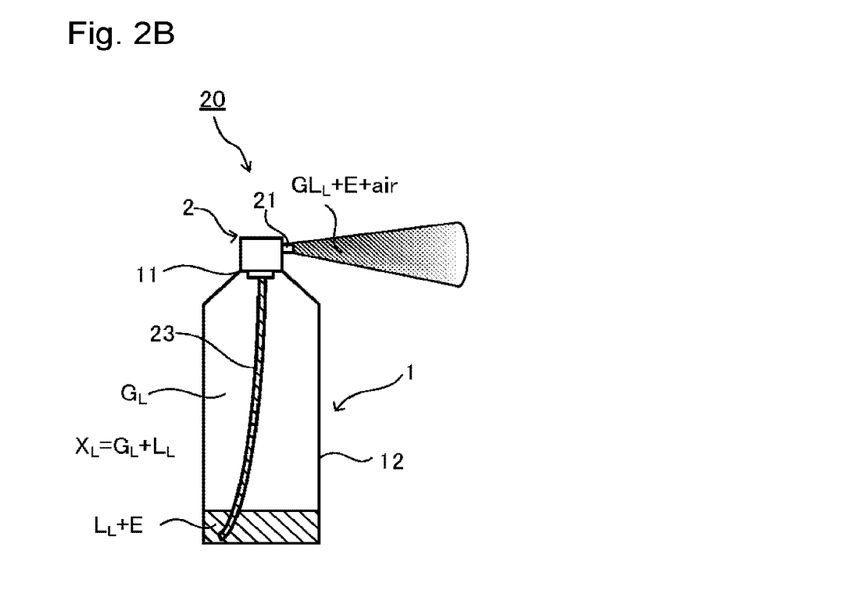
FIG. 2B is a schematic view illustrating a use example of one example of a two component type of the sprayer of the present invention.

FIGS. 1A and 1B are schematic views illustrating a use example of one example of a one component type of the sprayer of the present invention. FIGS. 2A and 2B are schematic views illustrating a use example of one example of a two component type of the sprayer of the present invention.

In FIG. 1A, a sprayer 10 comprises a container 1, a propellant composition $X_I$ containing 1224yd contained in the interior of the container 1, and a spray unit 2 to spray the propellant composition $X_I$ to the outside of the container. The container 1 has an accommodating portion 12 and an opening 11. The spray unit 2 is attached to the opening 11 of the container 1, and has a function to seal the interior of the container 1. The accommodating portion 12 of the container 1 is filled with the propellant composition $X_I$, and the propellant portion $X_I$ consists of a liquid phase portion $L_I$ and a gaseous phase portion $G_I$.

The spray unit 2 has an inlet 22 facing the accommodating portion 12, and has a mechanism to bring in the gaseous phase portion $G_I$ of the propellant composition $X_I$ in the accommodating portion 12 into the interior of the spray unit 2 from the inlet 22. The spray unit 2 has a spray nozzle 21 provided so as to face the outside of the container 1 and connected to the inlet 22 via a flow path in the interior of the spray unit 2. The spray unit 2 has a mechanism to spray the gaseous phase portion $G_I$ of the propellant composition $X_I$ brought into the interior of the spray unit 2 to the outside of the container 1 from the spray nozzle 21.

FIGS. 1A and 1B illustrate a state where the gaseous phase portion $G_I$ of the propellant composition $X_I$ is sprayed from the sprayer 10. After the sprayer sprayed a required amount of the propellant composition at the time of use, it is stored in a sealed state, and its use may be completed after spraying of the propellant composition is repeated several times, or its use may be completed after spraying once. The spray unit has a function to spray the propellant composition to the outside of the sprayer at the time of use, and has a function to keep a sealed state of the sprayer when not used, and for example, switching is conducted by opening/closing of a valve.

Spraying of the gaseous phase portion $G_I$ of the propellant composition $X_I$ from the spray unit 2 is conducted utilizing a pressure of the propellant composition $X_I$ filled in the accommodating portion 12 of the container 1.

FIG. 1A illustrates a use example at an initial stage of use of the sprayer 10, and FIG. 1B illustrates a use example at a last stage of use of the sprayer 10. At the initial stage of use, the volume of the liquid phase portion $L_I$ of the propellant composition $X_I$ filled in the accommodating portion 12 of the container 1 is large as compared with the volume of the gaseous phase portion $G_I$. The liquid phase portion $L_I$ and the gaseous phase portion $G_I$ are in a gas-liquid equilibrium state. The sprayer 10 sprays the gaseous phase portion $G_I$ of the propellant composition $X_I$ from the spray unit 2 at the time of use, accompanied by vaporization of the liquid phase portion in an amount corresponding to the decreased gaseous phase portion to newly form a vapor-liquid equilibrium state in the accommodating portion 12 of the container 1. In such a manner, along with use of the sprayer 10, the volume of the liquid phase portion decreases in the accommodating portion 12 of the container, and the volume of the gaseous phase portion increases, and finally, the pressure in the interior of the container 1 in the sprayer 10 becomes equal to the pressure of the outside of the container 1, usually atmospheric pressure (=0.1013 MPa), and use of the sprayer is completed.

In the sprayer 10, by use of the sprayer, that is, along with spraying of the propellant composition to the outside, the liquid phase portion in the accommodating portion 12 in the container 1 is consumed and as a result, the pressure in the interior of the container 1 becomes equal to the pressure of the outside of the container 1, usually atmospheric pressure, whereby the use may be completed, or the pressure in the interior of the container 1 becomes equal to the pressure of the outside of the container 1, usually atmospheric pressure, in a state where the liquid phase portion remains in the accommodating portion 12 of the container 1, whereby the use may be completed.

FIG. 1B illustrates a use example of the last stage of use of the sprayer 10. In the sprayer 10 at this stage, the volume of the liquid phase portion $L_L$ of the propellant composition $X_L$ filled in the accommodating portion 12 of the container 1 is small as compared with the volume of the gaseous phase portion $G_L$.

In the sprayer 10 shown in FIG. 1A, in a case where the propellant composition $X_I$ is constituted solely by 1224yd, the compositions of the liquid phase portions $L_I$ and the gaseous phase portion $G_I$ are the same with 100 mass % of 1224yd. Further, in a case where the propellant composition $X_I$ is an azeotropic composition which is a mixture of two or more types of compounds containing 1224yd, the compositions of the liquid phase portion $L_I$ and the gaseous phase portion $G_I$ are the same. And, also in the sprayer 10 shown in FIG. 1B at the last stage of use, there is no difference in the composition between the liquid phase portion $L_L$ and the gaseous phase portion $G_L$, and further, these compositions have no difference in the compositions of the liquid phase portion $L_I$ and the gaseous phase portion $G_I$ at the initial stage of use.

On the other hand, in a case where the propellant composition $X_I$ filled in the sprayer 10 is a non-azeotropic composition which is a mixture of two or more types of compounds containing 1224yd, the composition of the liquid phase portion $L_I$ and the composition of the gaseous phase portion $G_I$ of the propellant composition $X_I$ are different from each other at the initial stage of use. And, along with use of the sprayer 10, the gas-liquid equilibrium of the liquid phase portion and the gaseous phase portion of the propellant composition in the accommodating portion 12 of the container 1 varies. Accordingly, in the sprayer 10 shown in FIG. 1B at the last stage of use, the compositions of the liquid phase portion $L_L$ and the gaseous phase portion $G_L$ are different from each other, and further, the compositions of the liquid phase portion $L_L$, the gaseous phase portion $G_L$, the liquid phase portion $L_I$ and the gaseous phase portion $G_I$ at the initial stage of use are different from one another.

In FIG. 2A, a sprayer 20 comprises a container 1, a propellant composition $X_I$ containing 1224yd contained in the interior of the container 1, and a spray unit 2 to spray the propellant composition $X_I$ to the outside of the container 1. In the sprayer 20, in the interior of the container 1, a chemical agent E is contained together with the propellant composition $X_I$, and the propellant composition $X_I$ is sprayed together with the chemical agent E by the spray unit 2 to the outside of the container 1. The container 1 has an accommodating portion 12 and an opening 11. The sprayer 2 is attached to the opening 11 of the container 1, and has a function to seal the interior of the container 1. The accommodating portion 12 of the container 1 is filled with the propellant composition $X_I$ and the chemical agent E. The propellant composition $X_I$ consists of a liquid phase portion $L_I$ and a gaseous phase portion $G_I$, and the chemical agent E is present in a liquid mixture with the liquid phase portion $L_I$. That is, the interior of the accommodating portion 12 of the container 1 is filled with a liquid mixture of the chemical agent E and the liquid phase portion $L_I$ of the propellant composition $X_I$, and the gaseous phase portion $G_I$ of the propellant composition $X_I$.

The spray unit 2 has a nozzle 23 which extends to the bottom of the accommodating portion 12 of the container 1, and has a mechanism to bring the liquid mixture of the chemical agent E and the liquid phase portion $L_I$ of the propellant composition $X_I$ in the accommodating portion 12 from the tip of the nozzle 23 into the interior of the spray unit 2 via the nozzle 23. The spray unit 2 has a spray nozzle 21 provided so as to face the outside of the container 1 and connected to the nozzle 23 via a flow path in the interior of the spray unit 2. The spray unit 2 has a mechanism to spray the liquid mixture of the chemical agent E and the liquid phase portion $L_I$ of the propellant composition $X_I$ brought into the interior of the spray unit 2 to the outside of the container 1 from the spray nozzle 21.

FIGS. 2A and 2B illustrate a state where the liquid mixture of the chemical agent E and the liquid phase portion $L_I$ of the propellant composition $X_I$ is sprayed from the sprayer 20. In the sprayer 20 also, the spray unit has, in the same manner as the sprayer 10, a function to spray the liquid mixture to the outside of the sprayer at the time of use and a function to keep a sealed state of the sprayer when not used, and for example, switching is conducted by opening/closing of a valve.

Spraying of the liquid mixture of the chemical agent E and the liquid phase portion $L_I$ of the propellant composition $X_I$ from the spray unit 2 is conducted by utilizing the pressure of the propellant composition $X_I$ filled in the accommodating portion 12 of the container 1.

FIG. 2A illustrates a use example at an initial stage of use of the sprayer 20, and FIG. 2B illustrates a use example at a last stage of use of the sprayer 20. At the initial stage of use, in the accommodating portion 12 of the container 1, the volume of the liquid mixture of the chemical agent E and the liquid phase portion $L_I$ of the propellant composition $X_I$ is large as compared with the volume of the gaseous phase portion $G_I$ of the propellant composition $X_I$. The liquid phase portion $L_I$ and the gaseous phase portion $G_I$ of the propellant composition $X_I$ are in a gas-liquid equilibrium state.

The sprayer 20 sprays the liquid mixture of the chemical agent E and the liquid phase portion $L_I$ of the propellant composition $X_I$ from the spray unit 2 at the time of use, accompanied by vaporization of the liquid phase portion of the propellant composition to compensate for the consumed volume of the liquid mixture, to newly form a gas/liquid equilibrium state in the liquid phase portion and the gaseous phase portion of the propellant composition, in the accommodating portion 12 of the container 1. In such a manner, along with use of the sprayer 20, in the accommodating portion 12 of the container 1, the volume of the liquid mixture decreases and in addition, the volume of the gaseous phase portion consisting of the propellant composition increases and finally, the pressure of the interior of the container 1 in the sprayer 20 becomes equal to the pressure of the outside of the container 1, usually atmospheric pressure, whereby use of the sprayer is completed.

In the sprayer 20 also, in the same manner as the sprayer 10, along with use of the sprayer, the liquid phase portion in the accommodating portion 12 of the container 1 is consumed and as a result, the pressure of the interior of the container 1 becomes equal to the pressure of the outside of the container 1, usually atmospheric pressure, whereby the use may be completed, or the pressure of the interior of the container 1 becomes equal to the pressure of the outside of the container 1, usually atmospheric pressure, in a state where the liquid phase portion remains in the accommodating portion 12 of the container 1, whereby the use may be completed.

FIG. 2B illustrates a use example at the last stage of use of the sprayer 20. In the sprayer 20 at this stage, in the accommodating portion 12 of the container 1, the volume of the liquid mixture of the chemical agent E and the liquid phase portion $L_I$ of the propellant composition $X_I$ is small as compared with the volume of the gaseous phase portion $G_I$ of the propellant composition $X_I$.

In the sprayer 20, in the same manner as the sprayer 10, in a case where the propellant composition $X_I$ is constituted solely by 1224yd or is an azeotropic composition, there is no difference in the composition between the liquid phase portion $L_I$ and the gaseous phase portion $G_I$ at the initial stage of use and the liquid phase portion $L_L$ and the gaseous phase portion $G_L$ at the last stage of use. However, in a case where the propellant composition $X_I$ is a mixture of two or more types of compounds containing 1224yd and is a non-azeotropic composition, all the compositions of the liquid phase portion $L_I$ and the gaseous phase portion $G_I$ at the initial stage of use and the liquid phase portion $L_L$ and the gaseous phase portion $G_L$ at the last stage of use are different.

In the sprayer of the present invention, the propellant composition to be sprayed satisfies the following requirements (1) and (2) throughout the entire period over which the sprayer is used:

(1) the propellant composition is incombustible.

(2) GWP is less than 10.

"Throughout the entire period over which the sprayer is used" means the entire period from the start of use of the sprayer until the pressure in the sprayer becomes equal to the pressure of the outside of the sprayer. The pressure of the outside of the sprayer is usually atmospheric pressure.

In the one component type sprayer 10, the propellant composition to be sprayed is the gaseous phase portion $G_I$ of the propellant composition $X_I$ filled in the accommodating portion 12 of the container 1. In order that the propellant composition to be sprayed from the sprayer 10 satisfies the requirement (1) throughout the entire period over which the sprayer is used, the gaseous phase portion of the propellant composition in the accommodating portion 12 of the container 1 should be incombustible from the gaseous phase portion $G_I$ at the initial stage of use via the gaseous phase portion $G_L$ to the last stage of use. When the propellant composition to be sprayed from the sprayer 10 satisfies the requirement (1) throughout the entire period over which the sprayer is used, the propellant composition has no combustibility even when mixed with air at any proportion as the gaseous phase portion $G_I$ or the gaseous phase portion $G_L$ is diffused to the outside of the container and diluted with air, and has high safety, as shown in FIGS. 1A and 1B.

In the two component type sprayer 20, the propellant composition to be sprayed is the liquid mixture of the chemical agent E and the liquid phase portion $L_I$ of the propellant composition $X_I$ in the accommodating portion 12 of the container 1. The liquid phase portion $L_I$ of the propellant composition $X_I$ in the liquid mixture is vaporized when sprayed and becomes gaseous phase $GL_I$ with no difference in the composition with the liquid phase portion $L_I$. In order that the propellant composition to be sprayed from the sprayer 20 satisfies the requirement (1) throughout the entire period over which the sprayer is used, the liquid phase portion of the propellant composition in the accommodating portion 12 of the container 1 should be incombustible from the liquid phase portion $L_I$ at the initial stage of use via the liquid phase portion $L_L$ to the last stage of use. When the propellant composition to be sprayed from the sprayer 20 satisfies the requirement (1), the propellant composition has no combustibility even when mixed with air at any proportion as the gaseous phase portion $GL_I$ or the gaseous phase portion $GL_L$ together with the chemical agent E is diffused to the outside of the container and diluted with air, and has high safety, as shown in FIGS. 2A and 2B.

In a case where the propellant composition is constituted solely by 1224yd, since 1224yd is incombustible as shown hereinafter, the propellant composition to be sprayed satisfies the requirement (1) for the sprayer throughout the entire period over which the sprayer is used. However, in a case where the propellant composition is a non-azeotropic composition containing 1224yd, in order that the propellant composition to be sprayed satisfies the requirement (1) for the sprayer throughout the entire period over which the sprayer is used, the initial composition of the propellant composition is determined considering the above-described composition change of the propellant composition to be sprayed.

Further, in a case where the propellant composition is constituted solely by 1224yd, GWP of 1224yd is 1, and the propellant composition to be sprayed satisfies the requirement (2) for the sprayer throughout the entire period over which the sprayer is used. GWP in a case where the propellant composition is a mixture is a weighted average by the composition mass. In order that the propellant composition to be sprayed satisfies the requirement (2) for the sprayer throughout the entire period over which the sprayer is used, the initial composition of the propellant composition is determined considering the above-described composition change of the propellant composition to be sprayed.

Further, in addition to that the propellant composition to be sprayed satisfies the above requirements (1) and (2) throughout the entire period over which the sprayer is used, the propellant composition is adjusted preferably so that the pressure in the container is within a range specified by High Pressure Gas Safety Act, that is, at most 0.8 MPaG (=0.9013 MPa) at 35° C. "G" in the pressure unit represents gage pressure. Now, the propellant composition used for the sprayer of the present invention will be described.

[Propellant Composition]

The propellant composition contains 1224yd, and is adjusted so that the pressure in the container of the sprayer in which the propellant composition is contained is higher than the pressure of the outside of the sprayer, and so that the propellant composition to be sprayed satisfies the requirements (1) and (2) throughout the entire period over which the sprayer is used.

(1224yd)

1224yd ($CF_3$—CF=CHCl) has halogen to suppress combustibility and a carbon-carbon double bond which is easily decomposable by OH radicals in the air, in its molecule. 1224yd has cis-trans isomers 1224yd(Z) and 1224yd(E). 1224yd(Z) has a boiling point of 15° C., and 1224yd(E) has a boiling point of 19° C. GWP of 1224yd(Z) is 1, and GWP of 1224yd(E) is <1. 1224yd(Z) has high chemical stability as compared with 1224yd(E).

1224yd(Z), 1224(E) and a mixture thereof, that is, 1224yd are incombustible.

1224yd used for the propellant composition according to the present invention has a proportion of 1224yd(Z) to the total amount of 1224yd of preferably from 50 to 100 mass %, more preferably from 80 to 100 mass %, further preferably from 90 to 100 mass %, still more preferably from 99 to 100 mass %, from the viewpoint of chemical stability.

As a method for producing 1224yd, for example, (I) a method of subjecting 1,2-dichloro-2,3,3,3-tetrafluoropropane (HCFC-234bb) to dehydrochlorination reaction, or (II) a method of subjecting 1,1-dichloro-2,3,3,3-tetrafluoropropene (CFO-1214ya) to hydrogen reduction may, for example, be mentioned.

In each production method, the product to be obtained is usually a 1224yd composition containing 1224yd(Z), 1224yd(E) and impurities other than 1224yd. It is possible to produce 1224yd(Z) and 1224yd(E) by purifying the obtained 1224yd composition. However, in order to obtain pure 1224yd(Z) and 1224yd(E), separation with high purity using a high performance separation apparatus is required, thus lowering the productivity. In the propellant composition of the present invention, from the viewpoint of production efficiency, within a range not to impair the effects of the present invention, the 1224yd composition containing as impurities a compound other than 1224yd resulting from production of 1224yd, may be used.

Further, particularly when 1224yd(Z) among 1224yd is used for the propellant composition, in the same manner as above, from the viewpoint of production efficiency, within a range not to impair the effects of the present invention, a 1224yd(Z) composition containing as impurities a compound other than 1224yd(Z) may be used.

(I) Dehydrochlorination Reaction of 234bb

234bb is brought into contact with a base dissolved in a solvent, that is, a base in a solution state, in a liquid phase, to conduct dehydrochlorination reaction of 234bb. 234bb may be produced, for example, by reacting 1234yf and chlorine in a solvent.

The compound other than 1224yd contained in the 1224yd composition obtained by the method (I) may be 234bb which is an unreacted raw material, and 1234yf, 2-chloro-1,3,3,3-tetrafluoropropene (HCFO-1224xe), 1214ya, 1,1,2-trichloro-2,3,3,3-tetrafluoropropane (CFC-224ba), 1,1,1,2-tetrachloro-2,3,3,3-tetrafluoropropane (CFC-214bb), 1-chloro-3,3,3-trifluoro-1-propine and 2-chloro-1,1,1,2-tetrafluoropropane (HCFC-244bb) and the like.

234bb, 1214ya, 224ba, 214bb, etc. in the 1224yd composition can be more completely removed by a purification method to such an extent not to impair the productivity. On the other hand, 1234yf, 1224xe, 1-chloro-3,3,3-trifluoro-1-propine and 244bb may not be completely removed in the purification method and they may remain in a very small amount, for example, in an amount of less than 1.5 mass % in total to the total amount of the obtained 1224yd composition.

Further, for example, in the 1224yd(Z) composition, 1224yd(E) is one of components which cannot completely be removed by the purification method and remain in a very small amount. That is, in the 1224yd(Z) composition, 1224yd(E) may remain in an amount of less than 1.5 mass % in total of 1234yf, 1224xe, 1-chloro-3,3,3-trifluoro-1-propine, 244bb and 1224yd(E) to the total amount of the obtained 1224yd(Z) composition.

Among the above trace components in the 1224yd composition, 1224xe and 1-chloro-3,3,3-trifluoro-1-propine, and in the case of the 1224yd(Z) composition, 1224yd(E) in addition to the above, are incombustible and have GWP of less than 10, and accordingly they may remain and be contained in the propellant composition in a total amount of less than 1.5 mass %.

Among the above trace components, 1234yf has GWP of 1 but has a combustible range. As described hereinafter, 1234yf is a component preferably used for the propellant composition in combination with 1224yd, and the composition with 1224yd will be described hereinafter.

As described above, in the 1224yd composition and the 1224yd(Z) composition containing the above compounds as impurities in a total amount of less than 1.5 mass % to the total amount of the composition, the impurities will not impair the effects of the present invention, and such a composition may be used as the propellant composition of the present invention.

(II) Method of Subjecting 1214ya to Hydrogen Reduction

1214ya is reduced using hydrogen in the presence of a catalyst so as to be converted to 1234yf, and 1224yd is obtained as an intermediate. By this reduction reaction, a variety of fluorinated compounds are formed as by-products in addition to 1224yd. 1214ya is produced, for example, by a method of subjecting 3,3-dichloro-1,1,1,2,2-pentafluoropropane (HCFC-225ca) and the like as raw materials to dehydrofluorination reaction in an alkaline aqueous solution in the presence of a phase transfer catalyst, or by a gaseous phase reaction in the presence of a catalyst such as chromium, iron, copper or activated carbon.

In such a case, 1224yd may be separated from the most part of 1214ya as an unreacted raw material and 1234yf as a final product, by conventional distillation.

Compounds other than 1224yd contained in the 1224yd composition after distillation obtained by the above method (II) may, for example, be 1,1,1,2-tetrafluoropropane (HFC-254eb), 2-chloro-1,1,3,3,3-pentafluoropropene (CFO-1215xc), 1,1,1,3,3,3-hexafluoropropane (HFC-236fa), 1234ze, fluorinated hydrocarbon represented by $C_4H_4F_4$, 1-chloro-1,2,2,3,3,3-hexafluoropropane (HCFC-226ca), 1-chloro-1,1,2,2,3,3-hexafluoropropane (HCFC-226cb), 1-chloro-1,3,3,3-tetrafluoropropene (HCFO-1224zb), 1,1,2,3-tetrafluoropropane (HFC-254ea), 2-chloro-1,1,1,2,3,3-hexafluoropropane (HCFC-226ba), 1224xe, 1214ya, 1,3-dichloro-1,2,3,3-tetrafluoropropene (CFO-1214yb), 1,2-dichloro-1,3,3,3-tetrafluoropropene (CFO-1214xb), 244bb, 1,1,1,3,3-pentafluoropropane (HFC-245fa), 225ca and 1,1,1,2,2,3,3-heptafluoropropane (FC-227ca).

The fluorinated hydrocarbon represented by $C_4H_4F_4$ may, for example, be 1,3,4,4-tetrafluoro-1-butene, 3,4,4,4-tetrafluoro-1-butene or 1,1,2,3-tetrafluoro-1-butene.

The impurities contained in the 1224yd composition form an azeotropic composition or an azeotrope-like composition with 1224yd, and accordingly a purification method by extractive distillation is effective as a purification method to obtain a purified composition. Extractive distillation is a method to facilitate separation by distillation by adding another component to a composition comprising a plurality of components to change the relative volatility of the predetermined component, and another component here will be referred to as an extraction solvent. The extraction solvent for 1224yd may, for example, be methanol, acetone, hexane, ethanol, 1214ya, chloroform, and 1,3-dichloro-1,1,2,2,3-pentafluoropropane (HCFC-225cb).

By the above purification treatment, among the above impurities, 236fa, 226ca, 226cb, 1224zb, 254ea, 226ba, 1214ya, 1214yb, 1214xb, etc. are completely removed from the crude composition. On the other hand, in the 1224yd composition, 1215xc, 254eb, 1234ze, the fluorinated hydrocarbon represented by $C_4H_4F_4$, 1224xe, 244bb, 245fa, 225ca and 227ca cannot be completely removed by the purification treatment and remain in a very small amount. Further, methanol, acetone, hexane, ethanol, 1214ya, chloroform, 225cb, etc. used as the extraction solvent may remain in a very small amount. Their total amount is, for example, preferably less than 1.5 mass % to the total amount of the 1224yd composition obtained.

Even in such a case, in the 1224yd(Z) composition, in addition to the above impurities, 1224yd(E) is one of components which cannot completely be removed by the purification method and remain in a very small amount.

Among the above trace components, 1234ze has GWP of 1 but has a combustible range. As described hereinafter, 1234ze is a component preferably used for the propellant composition in combination with 1224yd, and the composition with 1224yd will be described hereinafter.

As described above, in the 1224yd composition and the 1224yd(Z) composition containing the above compounds as impurities in a total amount of less than 1.5 mass % to the total amount of the composition, the impurities will not impair the effects of the present invention, and such compositions may be used as the propellant composition of the present invention.

(Propellant Component Other than 1224yd)

In the present invention, the propellant composition contains 1224yd. The propellant composition may contain a propellant component other than 1224yd within a range where the propellant composition can make the pressure in the container of the sprayer filled with the propellant composition higher than the pressure of the outside of the sprayer, usually atmospheric pressure, and the propellant composition to be sprayed satisfies the above requirements (1) and (2) throughout the entire period over which the sprayer is used.

The propellant component other than 1224yd is preferably a hydrofluoroolefin (HFO). The most of HFOs have GWP of less than 10, and an incombustible HFO may constitute a propellant composition freely in combination with 1224yd as the case requires. The HFO is specifically preferably 1234yf, 1234ze or 1336mzz. The HFO may be used alone or in combination of two or more.

Among HFOs, 1234yf and 1234ze have a combustible range but have GWP of 1, have a lower boiling point than 1224yd, and can increase the pressure of the propellant composition $X_I$ in the accommodating portion 12 of the container 1.

A propellant composition comprising a combination of 1224yd and 1234yf or 1234ze to be sprayed satisfies the requirement (2) throughout the entire period over which the sprayer is used, in any composition. With respect to the propellant composition comprising a combination of 1224yd and 1234yf or 1234ze, the initial composition in order that the propellant composition to be sprayed satisfies the requirement (1) throughout the entire period over which a one component type sprayer from which the gaseous phase portion in the container is sprayed, is determined, for example, as follows.

(i) Condition setting is carried out. The conditions are the temperature and the volume ratio of the liquid phase portion and the gaseous phase portion of the propellant composition in the accommodating portion of the container at an initial state.

(ii) The initial composition of the propellant composition to be introduced to the accommodating portion of the container is set.

(iii) Whether or not the propellant composition (gaseous phase portion) to be sprayed satisfies the requirement (1) from the beginning to the end (the vapor pressure of the liquid phase portion becomes atmospheric pressure) when kept being sprayed at the constant temperature is confirmed.

(iv) Back to (ii), the initial composition is changed.

(v) (ii) to (iv) are repeatedly carried out until the initial composition range within which the propellant composition (gaseous phase portion) sprayed in (iii) satisfies the requirement (1) from the beginning to the end, is found.

The composition change of the liquid phase portion and the gaseous phase portion during the use period in (iii) is carried out by calculation. Physical properties of 1224yd used for the calculation were calculated based on physical properties described in Akasaka, R., Fukushima, M., Lemmon, E. W., "A Helmholtz Energy Equation of State for cis-1-chloro-2,3,3,3-tetrafluoropropene (R-1224yd(Z))", European Conference on Thermophysical Properties, Graz, Austria, Sep. 3-8, 2017. Physical properties of compounds other than 1224yd were calculated based on physical values of REFPROP ver. 9.1 of NIST (National Institute of Standards and Technology). The composition change was calculated by using REFLEAK ver. 4.0 of NIST (National Institute of Standards and Technology).

According to the above setting method, for example, with respect to the propellant composition comprising 1224yd(Z) and 1234ze(E), in a case where the volume ratio of the liquid phase portion and the gaseous phase portion of the propellant composition in the accommodating portion of the container at 10° C. at an initial state, is such that the liquid phase portion is 90 vol %, the requirement (1) is satisfied when the proportion of the content of 1224yd(Z) is at least 42 mass % and less than 100 mass % and the proportion of the content of 1234ze(E) is higher than 0 mass % and at most 58 mass %, to the total amount of 1224yd(Z) and 1234ze(E) in the propellant composition. Further, from the viewpoint of spraying properties, the proportion of the content of 1224yd(Z) is preferably at least 42 mass % and at most 63 mass %, and the proportion of the content of 1234ze(E) is preferably at least 37 mass % and at most 58 mass %.

According to the above setting method, with respect to the propellant composition comprising 1224yd(Z) and 1234yf, in a case where the volume ratio of the liquid phase portion and the gaseous phase portion of the propellant composition in the accommodating portion of the container at 10° C. at an initial state, is such that the liquid phase portion is 90 vol %, the requirement (1) is satisfied when the proportion of the content of 1224yd(Z) is at least 67 mass % and less than 100 mass % and the proportion of the content of 1234yf is higher than 0 mass % and at most 33 mass %, to the total amount of 1224yd(Z) and 1234ze(E) in the propellant composition. Further, from the viewpoint of spraying properties, the proportion of the content of 1224yd(Z) is preferably at least 67 mass % and at most 77 mass %, and the proportion of the content of 1234ze(E) is preferably at least 23 mass % and at most 33 mass %.

In each of the propellant composition comprising 1224yd (Z) and 1234ze(E) and the propellant composition comprising 1224yd(Z) and 1234yf, the concentration of 1234ze(E) or 1234yf in the gaseous phase portion is high as compared with the liquid phase portion, since the boiling points of 1234ze(E) (boiling point: −19° C.) and 1234yf (boiling point: −29.4° C.) are low as compared with 1224yd(Z). Accordingly, the concentration of 1234ze(E) or 1234yf in the gaseous phase portion decreases along with use, and thus when the propellant composition (gaseous phase portion) sprayed at the beginning is incombustible in (iii), such a propellant composition can be considered to be incombustible to the end.

That is, the propellant composition comprising 1224yd(Z) and 1234ze(E) to be sprayed is incombustible throughout the entire period over which the sprayer is used when the proportion of the content of 1224yd(Z) is at least 20 mass % and less than 100 mass % and the proportion of the content of 1234ze(E) is higher than 0 mass % and at most 80 mass %, to the total amount of 1224yd(Z) and 1234ze(E) in the gaseous phase portion of the propellant composition when filled so that the liquid phase portion in the container is 90 vol %. Further, the propellant composition comprising 1224yd(Z) and 1234yf to be sprayed is incombustible throughout the entire period over which the sprayer is used when the proportion of the content of 1224yd(Z) is at least 30 mass % and less than 100 mass % and the proportion of the content of 1234yf is higher than 0 mass % and at most 70 mass %, to the total amount of 1224yd(Z) and 1234yf in the gaseous phase portion of the propellant composition when filled so that the liquid phase portion in the container is 90 vol %.

Further, with respect to a two component type sprayer from which the liquid phase portion in the container is sprayed, the initial composition so that the propellant composition (1) to be sprayed satisfies the requirement (1) throughout the entire period over which the sprayer is used, may be obtained, for example, by conducting the same calculation changing the propellant composition to be sprayed in (iii) from the gaseous phase portion to the liquid phase portion.

Further, the same calculation as above may be applicable even when the temperature condition or the volume ratio of the liquid phase portion and the gaseous phase portion of the propellant composition in the initial accommodating portion is changed. Further, the same calculation may be applicable also in a case where the compound to be combined is changed.

(Other Component)

The propellant composition may optionally contain components other than the above propellant components. The propellant composition may contain, as other component, for example, a pressurizing agent. The pressurizing agent may, for example, be specifically nitrogen, carbon dioxide or an inert gas. The inert gas may, for example be helium, argon, krypton, xenon or radon.

The propellant composition may further contain a known additive such as a lubricant or a stabilizer. The stabilizer is a component which improves the stability of the propellant component against heat and oxidation. As the stabilizer, a known stabilizer which has been used for a propellant composition containing a halogenated hydrocarbon, for example, an oxidation resistance-improving agent, a heat resistance-improving agent and a metal deactivator may be used without any particular restriction. For the propellant composition to be used in the present invention, particularly a stabilizer to improve the stability of 1224yd is preferred.

The oxidation-resistance improving agent and the heat resistance-improving agent may, for example, be a phenol compound, an unsaturated hydrocarbon group-containing aromatic compound, an aromatic amine compound, an aromatic thiazine compound, a terpene compound, a quinone compound, a nitro compound, an epoxy compound, a lactone compound, an orthoester compound, a mono- or dialkali metal salt of phthalic acid, or a thiodiphenyl ether hydroxide compound.

Further, the metal deactivator may be a heterocyclic nitrogen-containing compound such as an imidazole compound, a thiazole compound or a triazole compound, an amine salt of an alkyl acid phosphate or its derivative.

The content of the stabilizer may be within a range not to remarkably impair the effects of the present invention, and is preferably from 1 mass ppm to 10 mass %, more preferably from 5 mass ppm to 5 mass % in the propellant composition (100 mass %).

(Impurities in Propellant Composition)

The sprayer is usually stored for a predetermined time from its production until its use. Accordingly, there may be problems if the propellant composition contains the after-described impurities in a predetermined amount or more. The amount of each impurity is preferably at most a predetermined amount.

<Acid Content>

If an acid content is present in the propellant composition, it has adverse effects such as decomposition of the propellant component. The concentration of the acid content in the propellant composition is, as the concentration by acid-alkali titration method, preferably less than 1 mass ppm, particularly preferably at most 0.8 mass ppm. The concentration of a predetermined component in the propellant composition means a mass proportion of the content of the component to the total amount of the propellant composition.

<Moisture>

If moisture is included in the propellant composition, problems such as hydrolysis of the propellant component, material deterioration by an acid component generated in the container, and contaminants may arise. The moisture content in the propellant composition is, as the moisture content measured by Karl Fischer coulometric titration method, preferably at most 20 mass ppm, particularly preferably at most 15 mass ppm to the total amount of the propellant composition.

<Air>

If air (nitrogen: about 80 vol %, oxygen: about 20 vol %) is included in the propellant composition, it has adverse effects over the performance of the propellant composition, and accordingly it is necessary to prevent inclusion of air as far as possible. Particularly, oxygen in air reacts with the propellant component and promotes its decomposition. The air concentration in the propellant composition is, as the air concentration measured by gas chromatography, preferably less than 15,000 mass ppm, particularly preferably at most 8,000 mass ppm.

(Chemical Agent)

In a case where the sprayer of the present invention is a two component type, a chemical agent is sealed together with the propellant composition in the container. As the chemical agent, a chemical agent known as a chemical agent used together with the propellant composition for a two component type sprayer may be used without any particular restriction. The chemical agent may, for example, be a cleaning agent, a fungicide, a coating material, a deodorant, a waterproof agent, a disinfectant, an evaporative cooling agent, a hair dye, a pharmaceutical, an anticorrosive agent, an anti-fouling agent, an anti-fogging agent, a lubricant, a release agent, an electrostatic/antistatic agent, an extreme-pressure agent, a penetrating agent and an adhesive.

(Method for Producing Sprayer)

As the member constituting the sprayer of the present invention, a member constituting a known sprayer, for example, a container and a spray unit may be used without any particular restriction, except that the above propellant composition containing 1224yd is used as the propellant composition. As the production method also, known production methods corresponding to the one component type and the two component type may be applicable.

The embodiments of the sprayer of the present invention were described above, however, the sprayer of the present invention is not limited to the above embodiments. Various changes and modifications are possible without departing from the intention and the scope of the present invention.

EXAMPLES

Now, the present invention will be described in further detail with reference to Examples. However, it should be understood that the present invention is by no means restricted to such specific description.

(Combustion Test)

Combustibility was evaluated with respect to compositions comprising 1224yd(Z) and 1234ze(E) in Test Examples 1 to 4, compositions comprising 1224yd and 1234yf in Test Examples 5 to 8, 1224yd(Z) in Test Example 9, 1234ze(E) in Test Example 10 and 1234yf in Test Example 11, as identified in Table 1.

Evaluation of combustibility was carried out using a measuring apparatus as specified in ASTM E681-09. The interior of a round flask having an internal capacity of 12 liter controlled to a temperature of 60±3° C. was evacuated of air, and each composition, dry air and moisture were sealed until the pressure in the flask became 101.3 kPa±0.7 kPa. Then, a fire was made by discharge ignition under 15 kV at 30 mA for 0.4 second by electrodes disposed at a height of one third from the bottom of the flask, and spread of flame was visually confirmed. The amount of the moisture was 0.0088 g±0.0005 g per 1 g of dry air. The mixing ratio of each composition to dry air was changed by changing the amount of the composition sealed every 1.0 vol %±0.2 vol %, and whether the composition has combustibility or not was confirmed. When the angle of spread of the flame upward was at least 90 degrees, the composition was evaluated to have combustibility (combustible), and when the angle was less than 90 degrees, the composition was evaluated to have no combustibility (incombustible). The results are shown in Table 1.

| Test Example | Composition [mass %] | | | Combustibility |
|---|---|---|---|---|
| | 1224yd(Z) | 1234ze(E) | 1234yf | |
| 1 | 40 | 60 | | Incombustible |
| 2 | 30 | 70 | | Incombustible |
| 3 | 20 | 80 | | Incombustible |
| 4 | 10 | 90 | | Combustible |
| 5 | 50 | | 50 | Incombustible |
| 6 | 40 | | 60 | Incombustible |
| 7 | 30 | | 70 | Incombustible |
| 8 | 20 | | 80 | Combustible |
| 9 | 100 | — | — | Incombustible |
| 10 | — | 100 | — | Combustible |
| 11 | — | — | 100 | Combustible |

It was found from Table 1 that the composition comprising 1224yd(Z) and 1234ze(E) is incombustible when it has a proportion of the content of 1224yd(Z) of at least 20 mass % to the total amount of 1224yd(Z) and 1234ze(E). It was found that the composition comprising 1224yd(Z) and 1234yf is incombustible when it has a proportion of the content of 1224yd(Z) of at least 30 mass % to the total amount of 1224yd(Z) and 1234yf.

(Spray Test)

Example 1

Under temperature conditions of 10±3° C., a propellant composition comprising 1224yd(Z) and 1234ze(E) and having a content of 1224yd(Z) of 42 mass % and a content of 1234ze(E) of 58 mass % was filled in a pressure container so that 90 vol % of the propellant composition was in a liquid phase, and a valve as a spray unit was attached to the upper part of the pressure container to prepare a one component type sprayer. Using the sprayer, the following spray test was carried out in which the valve was opened to spray the gaseous phase of the propellant composition in the pressure container. The spray test was conducted entirely under temperature conditions of 10±3° C.

The pressure (kPa) in the pressure container at an initial state filled with the propellant composition (GWP: 1), the compositions of the liquid phase and the gaseous phase of the propellant composition, and the combustibility were obtained. Then, the pressure in the pressure container, the compositions of the liquid phase and the gaseous phase of the propellant composition, combustibility and GWP after spraying 20 mass % of the initial amount of the propellant composition charged, after spraying 40 mass %, after spraying 60 mass % and after spraying 80 mass %, were obtained. Further, the compositions of the liquid phase and the gaseous phase of the propellant composition in the pressure container, combustibility and GWP after the propellant composition was sprayed until the pressure in the pressure container became equal to atmospheric pressure (at the time of completion of use) were obtained. The composition of the propellant composition was measured by gas chromatography, and the combustion test was conducted by the above method. The results are shown in Table 2.

TABLE 2

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234ze(E) | 1224yd(Z) | 1234ze(E) | Liquid phase | Gaseous phase | |
| Initial | 241.4 | 42.0 | 58.0 | 20.0 | 80.0 | Incombustible | Incombustible | 1 |
| 20 | 231.9 | 47.3 | 52.7 | 23.0 | 77.0 | Incombustible | Incombustible | 1 |
| 40 | 217.6 | 54.8 | 45.2 | 27.6 | 72.4 | Incombustible | Incombustible | 1 |
| 60 | 192.4 | 66.6 | 33.4 | 36.3 | 63.7 | Incombustible | Incombustible | 1 |
| 80 | 136.7 | 87.1 | 12.9 | 61.4 | 38.6 | Incombustible | Incombustible | 1 |
| At the time of completion (88.4) | 101.3 | 96.7 | 0.3 | 85.9 | 14.1 | Incombustible | Incombustible | 1 |

As evident from Table 2, in the sprayer in Example 1, the propellant composition to be sprayed satisfied the requirements (1) and (2) throughout the entire period over which the sprayer was used.

Example 2

In the same manner as in Example 1 except that the composition of the propellant composition filled in the pressure container was changed so that the content of 1224yd(Z) was 45 mass % and the content of 1234ze(E) was 55 mass %, a sprayer was prepared, and the same spray test was carried out. The results are shown in Table 3.

TABLE 3

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234ze(E) | 1224yd(Z) | 1234ze(E) | Liquid phase | Gaseous phase | |
| Initial | 236.0 | 45.0 | 55.0 | 21.7 | 78.3 | Incombustible | Incombustible | 1 |
| 20 | 225.7 | 50.6 | 49.4 | 24.9 | 75.1 | Incombustible | Incombustible | 1 |
| 40 | 210.1 | 58.4 | 41.6 | 30.0 | 70.0 | Incombustible | Incombustible | 1 |
| 60 | 182.9 | 70.6 | 29.4 | 39.9 | 60.1 | Incombustible | Incombustible | 1 |
| 80 | 126.0 | 90.2 | 9.8 | 67.7 | 32.3 | Incombustible | Incombustible | 1 |
| At the time of completion (86.7) | 101.3 | 96.6 | 3.4 | 85.9 | 14.1 | Incombustible | Incombustible | 1 |

As evident from Table 3, in the sprayer in Example 2, the propellant composition to be sprayed satisfied the requirements (1) and (2) throughout the entire period over which the sprayer was used.

Comparative Example 1

In the same manner as in Example 1 except that the composition of the propellant composition filled in the pressure container was changed so that the content of 1224yd(Z) was 40 mass % and the content of 1234ze(E) was 60 mass %, a sprayer was prepared, and the same spray test was carried out. The results are shown in Table 4.

TABLE 4

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234ze(E) | 1224yd(Z) | 1234ze(E) | Liquid phase | Gaseous phase | |
| Initial | 245.0 | 40.0 | 60.0 | 18.9 | 81.1 | Incombustible | Combustible | 1 |
| 20 | 236.0 | 45.1 | 55.0 | 21.7 | 78.3 | Incombustible | Incombustible | 1 |
| 40 | 222.4 | 52.3 | 57.7 | 26.0 | 74.0 | Incombustible | Incombustible | 1 |
| 60 | 198.6 | 63.8 | 36.2 | 34.0 | 66.0 | Incombustible | Incombustible | 1 |
| 80 | 144.4 | 84.7 | 15.3 | 57.2 | 42.8 | Incombustible | Incombustible | 1 |
| At the time of completion (89.4) | 101.3 | 96.6 | 3.4 | 85.9 | 14.1 | Incombustible | Incombustible | 1 |

As evident from Table 4, in the sprayer in Comparative Example 1, the propellant composition to be sprayed did not satisfy the requirement (1) at the initial stage of use.

Example 3

In the same manner as in Example 1 except that the propellant composition filled in the pressure container was changed to a propellant composition comprising 1224yd(Z) and 1234yf and having a content of 1224yd(Z) of 67 mass % and a content of 1234yf of 33 mass %, a sprayer was prepared, and the same spray test was carried out. The results are shown in Table 5. In Example 3, the pressure in the pressure container became equal to atmospheric pressure before 80 mass % was sprayed, and thus evaluation after spraying 80 mass % was not conducted.

TABLE 5

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234yf | 1224yd(Z) | 1234yf | Liquid phase | Gaseous phase | |
| Initial | 239.8 | 67.0 | 33.0 | 30.2 | 69.8 | Incombustible | Incombustible | 1 |
| 20 | 208.0 | 75.5 | 24.5 | 38.0 | 62.0 | Incombustible | Incombustible | 1 |
| 40 | 163.0 | 85.9 | 14.1 | 52.5 | 47.5 | Incombustible | Incombustible | 1 |
| 60 | 110.1 | 96.1 | 3.9 | 80.2 | 19.8 | Incombustible | Incombustible | 1 |
| At the time of completion (64.4) | 101.3 | 97.6 | 2.4 | 86.8 | 13.2 | Incombustible | Incombustible | 1 |

As evident from Table 5, in the sprayer in Example 3, the propellant composition to be sprayed satisfied the requirements (1) and (2) throughout the entire period over which the sprayer was used.

Example 4

In the same manner as in Example 3 except that the composition of the propellant composition filled in the pressure container was changed so that the content of 1224yd(Z) was 70 mass % and the content of 1234yf was 30 mass %, a sprayer was prepared, and the same spray test was carried out. The results are shown in Table 6.

TABLE 6

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234yf | 1224yd(Z) | 1234yf | Liquid phase | Gaseous phase | |
| Initial | 228.8 | 70.0 | 30.0 | 32.7 | 67.3 | Incombustible | Incombustible | 1 |
| 20 | 195.7 | 78.5 | 21.5 | 41.4 | 58.6 | Incombustible | Incombustible | 1 |
| 40 | 150.6 | 88.5 | 11.5 | 57.6 | 42.4 | Incombustible | Incombustible | 1 |
| 60 | 103.6 | 97.2 | 2.8 | 85.0 | 15.0 | Incombustible | Incombustible | 1 |
| At the time of completion (61.3) | 101.3 | 97.6 | 2.4 | 86.8 | 13.2 | Incombustible | Incombustible | 1 |

As evident from Table 6, in the sprayer in Example 4, the propellant composition to be sprayed satisfied the requirements (1) and (2) throughout the entire period over which the sprayer was used.

Comparative Example 2

In the same manner as in Example 3 except that the composition of the propellant composition filled in the pressure container was changed so that the content of 1224yd(Z) was 65 mass % and the content of 1234yf was 35 mass %, a sprayer was prepared, and the same spray test was carried out. The results are shown in Table 7.

TABLE 7

| Spray amount (mass % to initial amount charged) | Pressure in container (kPa) | Composition of propellant composition [mass %] | | | | Combustibility | | GWP |
|---|---|---|---|---|---|---|---|---|
| | | Liquid phase | | Gaseous phase | | | | |
| | | 1224yd(Z) | 1234yf | 1224yd(Z) | 1234yf | Liquid phase | Gaseous phase | |
| Initial | 246.9 | 65.0 | 35.0 | 28.7 | 71.3 | Incombustible | Combustible | 1 |
| 20 | 216.0 | 73.4 | 26.6 | 35.9 | 64.1 | Incombustible | Incombustible | 1 |
| 40 | 171.6 | 84.0 | 16.0 | 49.3 | 50.7 | Incombustible | Incombustible | 1 |
| 60 | 115.4 | 95.2 | 4.8 | 76.6 | 23.4 | Incombustible | Incombustible | 1 |
| At the time of completion (66.3) | 101.3 | 97.6 | 2.4 | 86.8 | 13.2 | Incombustible | Incombustible | 1 |

As evident from Table 7, in the sprayer in Comparative Example 2, the propellant composition to be sprayed did not satisfy the requirement (1) at the initial stage of use.

REFERENCE SYMBOLS

10: sprayer (one component type), 20: sprayer (two component type), 1: container, 11: opening, 12: accommodating portion, 2: spray unit, 21: inlet, 22: spray nozzle, 23: nozzle, E: chemical agent, $X_f$: propellant composition (initial), $G_f$: gaseous phase portion (initial), $L_f$: liquid phase portion (initial), $X_L$: propellant composition (last), $G_L$: gaseous phase portion (last), $L_L$: liquid phase portion (last)

This application is a continuation of PCT Application No. PCT/JP2018/036101, filed on Sep. 27, 2018, which is based upon and claims the benefit of priority from Japanese Patent Application No. 2017-187614 filed on Sep. 28, 2017. The contents of those applications are incorporated herein by reference in their entireties.

What is claimed is:

1. A sprayer, comprising:
   a container,
   a propellant composition comprising (Z)-1-chloro-2,3,3,3-tetrafluoropropene and (E)-1,3,3,3-tetrafluoropropene, wherein the (Z)-1-chloro-2,3,3,3-tetrafluoropropene is present in an amount of 20 mass % or more and less than 100 mass %, and the (E)-1,3,3,3-tetrafluoropropene is present in an amount of more than 0 mass % and less than 80 mass %, where mass % is based on the total mass of (Z)-1-chloro-2,3,3,3-tetrafluoropropene and (E)-1,3,3,3-tetrafluoropropene, and wherein the propellant composition is contained under pressure as a liquid and a gas in the interior of the container, and
   a spray unit to spray the propellant composition out of the container,
   wherein the propellant composition satisfies the following requirements (1) and (2) throughout an entire period over a first state of the sprayer and a second state of the sprayer:
      (1) a no combustibility combustion test result in a combustion test on a mixture of the propellant composition and air in a container controlled at 60° C.±3° C. under 101.3 kPa±0.7 kPa as specified in ASTM E-681-09, such that no combustibility corresponds with the combustion test result when the mixture has no combustibility in the entire range of a proportion of the propellant composition to the total volume of the mixture being higher than 0 vol % and up to 100 vol % and when, in a gaseous phase in the vicinity of the center of the container, a fire is made by discharge ignition under 15 kV at 30 mA for 0.4 second, spread of flame is visually confirmed, and when the angle of spread of the flame upward is less than 90 degrees;
      (2) the global warming potential (100 years) in accordance with Intergovernmental Panel on Climate Change (IPCC), Fifth assessment report, is less than 10;
   wherein the first state of the sprayer:
      a first liquid volume of the propellant composition in the container is at most 90 vol % of a volume of the container at a first pressure, and
   wherein the second state of the sprayer:
      a second liquid volume of the propellant composition in the container is less than the first liquid volume at a second pressure, wherein the second pressure is atmospheric pressure.

2. The sprayer according to claim 1, wherein the 1-chloro-2,3,3,3-tetrafluoropropene consists essentially of (Z)-1-chloro-2,3,3,3-tetrafluoropropene and (E)-1-chloro-2,3,3,3-tetrafluoropropene, and the proportion of (Z)-1-chloro-2,3,3,3-tetrafluoropropene to the total amount of 1-chloro-2,3,3,3-tetrafluoropropene is at least 80 mass % and at most 100 mass %.

3. The sprayer according to claim 1, wherein the propellant composition further contains a hydrofluoroolefin.

4. The sprayer according to claim 3, wherein the hydrofluoroolefin contains at least one member selected from 2,3,3,3-tetrafluoropropene, 1,3,3,3-tetrafluoropropene and 1,1,1,4,4,4-hexafluoro-2-butene.

5. The sprayer according to claim 1, wherein the propellant composition comprises (Z)-1-chloro-2,3,3,3-tetrafluoropropene and (E)-1,3,3,3-tetrafluoropropene, and the proportion of (Z)-1-chloro-2,3,3,3-tetrafluoropropene is at least 20 mass % and less than 100 mass % to the total mass of (Z)-1-chloro-2,3,3,3-tetrafluoropropene and (E)-1,3,3,3-tetrafluoropropene in a gaseous phase portion in the container filled with the propellant composition so that the liquid phase portion is 90 vol %.

6. The sprayer according to claim 1, wherein the propellant composition comprises (Z)-1-chloro-2,3,3,3-tetrafluoropropene and 2,3,3,3-tetrafluoropropene, and the proportion of (Z)-1-chloro-2,3,3,3-tetrafluoropropene is at least 30 mass % and less than 100 mass % to the total mass of (Z)-1-chloro-2,3,3,3-tetrafluoropropene and 2,3,3,3-tetrafluoropropene in a gaseous phase portion in the container filled with the propellant composition so that the liquid phase portion is 90 vol %.

7. The sprayer according to claim 1, wherein the propellant composition is an azeotropic mixture.

8. The sprayer according to claim 1, wherein the propellant composition is a non-azeotropic mixture comprising one or more of (Z)-1-chloro-2,3,3,3-tetrafluoropropene and 2,3,3,3-tetrafluoropropene.

9. The sprayer according to claim 1, wherein the propellant composition consists essentially of (Z)-1-chloro-2,3,3,3-tetrafluoropropene and (E)-1,3,3,3-tetrafluoropropene, wherein the (Z)-1-chloro-2,3,3,3-tetrafluoropropene is present in an amount of 30-50 mass % and the (E)-1,3,3,3-tetrafluoropropene is present in an amount of 50-70 mass % based on the total mass of the propellant composition at the first state of the sprayer.

10. The sprayer according to claim 1, wherein the pressure at the first state is up to 241 kPa.

11. The sprayer according to claim 1, wherein the propellant composition contains from 42.0 to 66.6 mass % of (Z)-1-chloro-2,3,3,3-tetrafluoropropene and from 58.0 to 33.4 mass % of (E)-1,3,3,3-tetrafluoropropene in a liquid state, and from 20.0-36.3 mass % of (Z)-1-chloro-2,3,3,3-tetrafluoropropene and from 63.7 to 80.0 mass % of (E)-1-chloro-2,3,3,3-tetrafluoropropene in a gaseous state inside the container.

12. The sprayer according to claim 1, wherein the propellant composition contains from 45.0-58.4 mass % of (Z)-1-chloro-2,3,3,3-tetrafluoropropene and from 41.6 to 55.0 mass % of (E)-1,3,3,3-tetrafluoropropene in a liquid state inside the container, and from 21.7 to 30.0 mass % of (Z)-1-chloro-2,3,3,3-tetrafluoropropene and from 70.0 to 78.3 mass % of (E)-1,3,3,3-tetrafluoropropene in a gaseous state inside the container.

13. The sprayer according to claim 1, wherein at the second state when the pressure is atmospheric pressure, the container contains 11.6-13.3 mass % of the propellant composition based on the total mass of the propellant composition present in the container in an amount of 90 volume % in the liquid phase based on the volume of the container.

14. The sprayer according to claim 1, wherein the propellant composition comprises from 67.0 to 85.9% of (Z)-1-chloro-2,3,3,3-tetrafluoropropene and from 33.0 to 14.1 mass % of 2,3,3,3-tetrafluoropropene in a liquid state in the container, and from 30.2 to 52.5 mass % of (Z)-1-chloro-2,3,3,3-tetrafluoropropene and from 47.5 to 69.8 mass % of 2,3,3,3-tetrafluoropropene in a gaseous state in the container.

15. A sprayer, comprising:
a container,
a propellant composition comprising (Z)-1-chloro-2,3,3,3-tetrafluoropropene and 2,3,3,3-tetrafluoropropene, wherein the (Z)-1-chloro-2,3,3,3-tetrafluoropropene is present in an amount of 30 mass % or more and less than 100 mass %, and the 2,3,3,3-tetrafluoropropene is present in an amount of more than 0 mass % and less than 70 mass %, where mass % is based on the total mass of (Z)-1-chloro-2,3,3,3-tetrafluoropropene and 2,3,3,3-tetrafluoropropene, and wherein the propellant composition is contained under pressure as a liquid and a gas in the interior of the container, and
a spray unit to spray the propellant composition out of the container,
wherein the propellant composition satisfies the following requirements (1) and (2) throughout an entire period over a first state of the sprayer and a second state of the sprayer:
(1) a no combustibility combustion test result in a combustion test on a mixture of the propellant composition and air in a container controlled at 60° C.±3° C. under 101.3 kPa±0.7 kPa as specified in ASTM E-681-09, such that no combustibility corresponds with the combustion test result when the mixture has no combustibility in the entire range of a proportion of the propellant composition to the total volume of the mixture being higher than 0 vol % and up to 100 vol % and when, in a gaseous phase in the vicinity of the center of the container, a fire is made by discharge ignition under 15 kV at 30 mA for 0.4 second, spread of flame is visually confirmed, and when the angle of spread of the flame upward is less than 90 degrees;
(2) the global warming potential (100 years) in accordance with Intergovernmental Panel on Climate Change (IPCC), Fifth assessment report, is less than 10;
wherein the first state of the sprayer:
a first liquid volume of the propellant composition in the container is at most 90 vol % of a volume of the container at a first pressure, and
wherein the second state of the sprayer:
a second liquid volume of the propellant composition in the container is less than the first liquid volume at a second pressure, wherein the second pressure is atmospheric pressure.

16. The sprayer according to claim 1, wherein the propellant composition comprises (Z)-1-chloro-2,3,3,3-tetrafluoropropene and (E)-1,3,3,3-tetrafluoropropene, wherein the (Z)-1-chloro-2,3,3,3-tetrafluoropropene is present in an amount of 42 mass % or more and less than 100 mass %, and the (E)-1,3,3,3-tetrafluoropropene is present in an amount of more than 0 mass % and less than 58 mass %, where mass % is based on the total mass of (Z)-1-chloro-2,3,3,3-tetrafluoropropene and (E)-1,3,3,3-tetrafluoropropene.

17. The sprayer according to claim 1, which is a one-component sprayer containing the propellant composition as the only liquid phase in the sprayer.

18. The sprayer according to claim 1, which is a two-component sprayer containing mainly the propellant composition as the liquid phase in the sprayer.

* * * * *